US012077438B2

(12) United States Patent
Arnold et al.

(10) Patent No.: US 12,077,438 B2
(45) Date of Patent: Sep. 3, 2024

(54) TRANSFER OF NANOSTRUCTURES USING CROSSLINKABLE COPOLYMER FILMS

(71) Applicant: Wisconsin Alumni Research Foundation, Madison, WI (US)

(72) Inventors: Michael Scott Arnold, Middleton, WI (US); Robert Michael Jacobberger, Evanston, IL (US); Padma Gopalan, Madison, WI (US); Jonathan H. Dwyer, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 557 days.

(21) Appl. No.: 17/209,944

(22) Filed: Mar. 23, 2021

(65) Prior Publication Data

US 2022/0306475 A1 Sep. 29, 2022

(51) Int. Cl.
*C01B 32/194* (2017.01)
*C09D 133/12* (2006.01)

(52) U.S. Cl.
CPC .......... *C01B 32/194* (2017.08); *C09D 133/12* (2013.01); *C01B 2204/06* (2013.01); *C01P 2004/03* (2013.01)

(58) Field of Classification Search
CPC ............... C01B 2204/06; C01B 32/194; C01P 2004/03; C08L 2312/00; C09D 133/068; C09D 133/12
See application file for complete search history.

(56) References Cited

U.S. PATENT DOCUMENTS 10,106,643 B2 10/2018 Schwartz et al.
2007/0092431 A1* 4/2007 Resasco ................ C01B 32/162 427/430.1
2019/0232630 A1* 8/2019 Cong ...................... B32B 9/041
2019/0256357 A1 8/2019 Choi
2020/0144014 A1 5/2020 Wei et al.
2022/0306475 A1* 9/2022 Arnold ................. C09D 133/12

FOREIGN PATENT DOCUMENTS

CN 103964422 A 8/2014
CN 107364851 B 8/2019
CN 110156001 A 8/2019
KR 2017/0125998 11/2017
WO WO 02-36353 A2 5/2002

(Continued)

OTHER PUBLICATIONS

Patent Family for U.S. Appl. No. 17/209,944 (Year: 2023).*

(Continued)

*Primary Examiner* — Sonya M Sengupta
(74) *Attorney, Agent, or Firm* — Bell & Manning, LLC

(57) ABSTRACT

Methods of transferring nanostructures from a first substrate to another substrate using a copolymer polymerized from one or more non-crosslinking monomers and one or more comonomers bearing crosslinkable groups as a transfer medium are provided. Relative to a poly(methyl methacrylate) homopolymer, the crosslinkable copolymers bond more strongly to the first substrate and, as a result, are able to transfer even very narrow nanostructures between substrates with high transfer yields.

19 Claims, 4 Drawing Sheets

(56) References Cited

FOREIGN PATENT DOCUMENTS

WO WO 2016/071780 5/2016

OTHER PUBLICATIONS

Written Opinion for PCT/US2022/070884.*
Written Opinion of PCT/CN2019/097183.*
Written Opinion of PCT/US2022/070884.*
Chandrashekar et al. "A Universal Stamping Method of Graphene Transfer for Conducting Flexible and Transparent Polymers," Scientific Reports 9:3999, Mar. 8, 2019.
Martins et al. "Direct transfer of graphene onto flexible substrates," *PNAS*, vol. 110, No. 44, pp. 17762-17767, Oct. 23, 2013.
Kobayashi et al., "Production of a 100-m-long high-quality graphene transparent conductive film by roll chemical vapor deposition and transfer process," *App. Phys. Lett.* 102, 023112 (2013).
Gong et al., "Interfacial Stress Transfer in a Graphene Monolayer Nanocomposite," *Advanced Materials*, vol. 22, Issue 24, Jun. 25, 2010, pp. 2694-2697.
Li et al., "Transfer of Large-Area Graphene Films for High-Performance Transparent Conducive Electrodes," *Nano Letters*, vol. 9, No. 12, pp. 4359-4363, Sep. 2009.
Liu et al., "Chemical Patterns for Directed Self-Assembly of Lamellae-Forming Block Copolymers with Density Multiplication of Features," *Macromolecules* 2013, 46, 1415-1424.
Wood et al., "Annealing Free, Clean Graphene Transfer using Alternative Polymer Scaffolds," 2015 *Nanotechnology* 26 055302.
Mansfeld et al., "Clickable initiators, monomers and polymers in controlled radical polymerizations—a prospective combination in polymer science," *Poly. Chem.*, May 2010, 1, 1560-1598.
International Search Report and Written Opinion for PC/US2022/070884, mailed on Jun. 15, 2022, pp. 1-10.
Extended European Search Report in EP Patent Application No. 22776810.8 dated Jul. 9, 2024, 5 pages.

* cited by examiner

TRANSFER OF NANOSTRUCTURES USING CROSSLINKABLE COPOLYMER FILMS

REFERENCE TO GOVERNMENT RIGHTS

This invention was made with government support under D18AP00043 awarded by DOD/DARPA. The government has certain rights in the invention.

BACKGROUND

Semiconducting graphene nanoribbons are promising candidates for succeeding and/or complementing silicon (Si) in logic microprocessors and Group III-V compounds in radio frequency devices and for integrating into emerging thin film, optoelectronic, spintronic, and quantum devices because of their large current-carrying capacity, high carrier velocity, bandgap tunability, and outstanding thin-body electrostatic control. To meet the demands of most of these applications, nanoribbons narrower than 5 nm are desirable, as they can have technologically relevant bandgaps arising from quantum confinement effects.

Graphene nanoribbons are high aspect ratio graphene structures comprising single-layer or few-layer graphene. Graphene nanoribbons often need to be transferred from the substrates on which they are formed to a device substrate. In one common transfer technique, poly(methyl methacrylate) (PMMA) is coated over the graphene nanoribbons, followed by the etching and removal of the underlying growth substrate. Once the substrate is removed, a PMMA/graphene nanoribbon membrane remains, which can be fished out of the etching solution and transferred onto a desired substrate, such as a silicon dioxide ($SiO_2$)/Si wafer. The residual PMMA is then dissolved using a suitable solvent and thermal treatment. While this method works well for graphene nanoribbons having larger widths, it is not well-suited for the transfer of very narrow nanoribbons.

SUMMARY

Methods for transferring nanostructures between surfaces using crosslinkable organic copolymers are provided.

One embodiment of a method for transferring one or more nanostructures from a first substrate to a second substrate includes the steps of: applying a coating of a crosslinkable copolymer over one or more nanostructures on a surface of the first substrate, wherein the crosslinkable copolymer is polymerized from one or more non-crosslinking monomers and one or more comonomers bearing crosslinkable groups; heating the crosslinkable copolymer to induce crosslinking of the crosslinkable copolymer and to form bonds between the crosslinkable copolymer and the surface of the first substrate; releasing the one or more nanostructures and the crosslinked copolymer from the first substrate; transferring the one or more nanostructures and the crosslinked copolymer onto a surface of the second substrate; and removing the crosslinked copolymer from the one or more nanostructures.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Methods of transferring nanostructures from one substrate to another using a crosslinkable copolymer as a transfer medium are provided. While the methods are particularly useful for transferring graphene nanoribbons from a substrate on which they are grown to a device substrate, the methods can be used to transfer a wide variety of nanostructures between a wide variety of different substrates.

Figure 1:
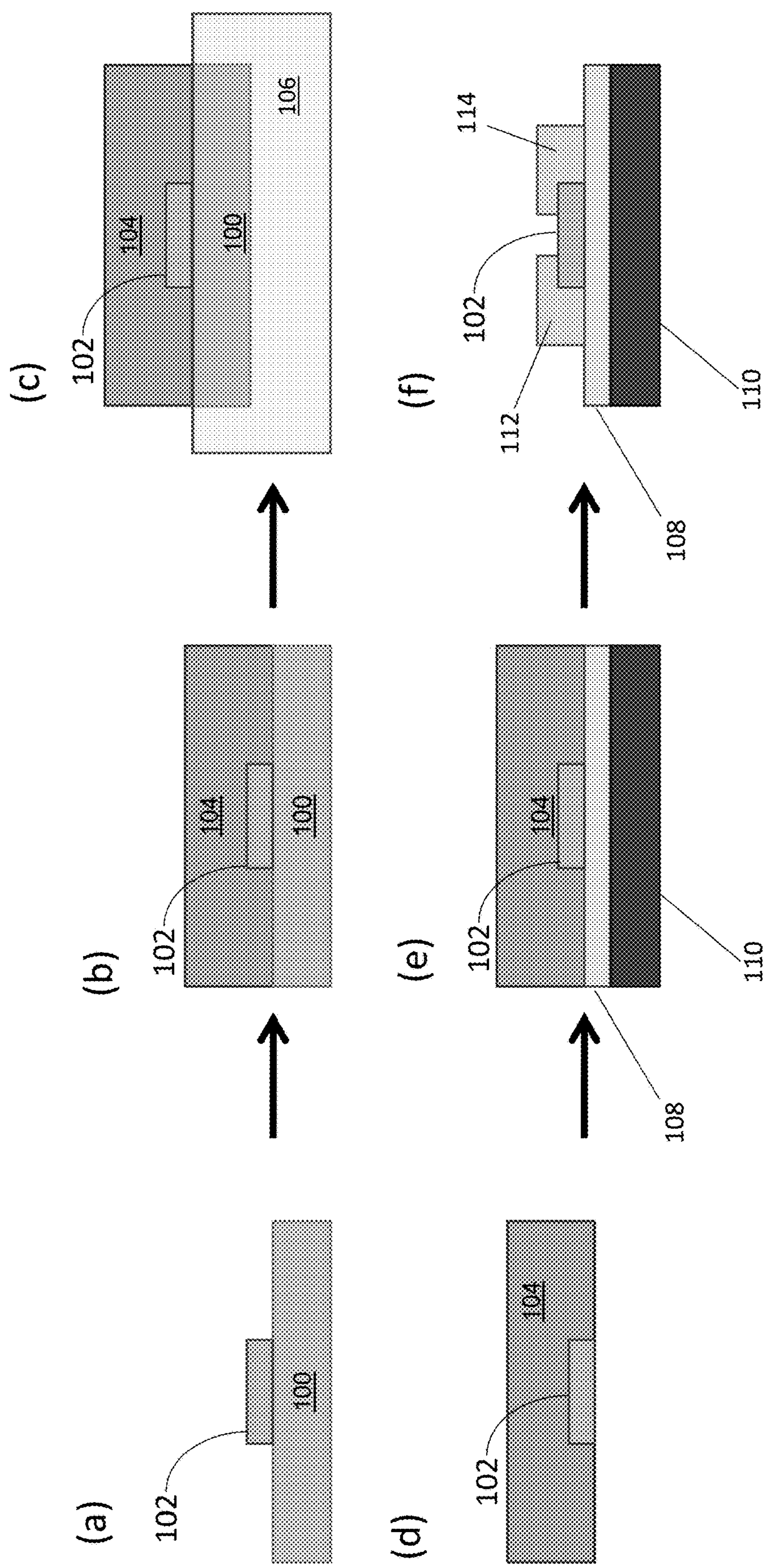
FIG. 1, panels (a)-(f), is a schematic diagram of a method for transferring nanostructures from one substrate to another substrate.

One embodiment of a method of transferring nanostructures from one substrate to another is shown schematically in FIG. 1, panels (a)-(f). The method begins with one or more nanostructures 102 disposed on a surface of a first substrate 100 (FIG. 1, panel (a)). A coating of a crosslinkable copolymer 104 is applied over the one or more nanostructures 102 and the exposed areas of the surface of the first substrate 100 (FIG. 1, panel (b)). Crosslinkable copolymer 104 is then heated to induce the crosslinking of the copolymer and bond formation between copolymer 104 and first substrate 100. First substrate 100 is then removed from nanostructures 102 and copolymer 104. This can be accomplished by, for example, exposing the substrate to a substrate-selective etchant 106 in an etch bath (FIG. 1, panel (c)), thereby releasing the one or more nanostructures 102 and overlying copolymer 104 (FIG. 1, panel (d)). The bonding of copolymer 104 to first substrate 100 via the heat treatment prior to substrate 100 removal is advantageous because the bonds can prevent the premature delamination of the one or more nanostructures 102 from copolymer 104 during the etching of first substrate 100.

One or more released nanostructures 102 are then transferred onto a surface of a second substrate 108 (FIG. 1, panel (e)). Optionally, the transferred nanostructures may then be annealed to bond the nanostructures to the second substrate. As shown in FIG. 1, panels (a)-(f), the second substrate may include more than one layer. For example, the substrate may include a thin overlayer 108 supported by a thicker handle substrate 110. Copolymer 104 is then removed and additional device components can be fabricated on and/or around the one or more transferred nanostructures 102. By way of illustration, a field-effect transistor can be fabricated using a $SiO_2$/Si substrate (108/110) by depositing a source electrode 112 and a drain electrode 114 on a semiconducting nanostructure 102 (FIG. 1, panel (f)).

As used herein, the term nanostructure refers to a structure having at least one dimension (e.g., height, width, length, thickness, or diameter) that is no greater than 1 μm. This includes structures having at least one dimension that is no greater than 100 nm further includes structures having at least one dimension that is no greater than 10 nm, and still further includes structures having at least one dimension that is no greater than 1 nm. The nanostructures include structures having at least two dimensions (e.g., length and width) that fall within the above-recited size ranges and structures for which even the largest cross-section dimension falls within the above-recited size ranges.

The one or more nanostructures may be composed of a variety of materials including inorganic semiconductors, metals (including metal alloys), and inorganic dielectric materials. Narrow, ultrathin, high-aspect ratio nanostructures are particularly good candidates for transfer using the methods described herein. Notably, existing methods for the transfer of narrow, ultrathin, high-aspect ratio nanostructures using PMMA homopolymer as a transfer medium typically have a poor transfer yield. In contrast, the present methods are able to transfer even dense arrays of many nanostructures, including narrow, ultrathin, high-aspect ratio nanostructures, with transfer yields of, or approaching, 100%. Such arrays may include ten, hundreds, or thousands of nanostructures.

Graphene nanostructures, such as graphene nanoribbons, are examples of ultrathin, high-aspect ratio nanostructures. Monolayer graphene is a two-dimensional hexagonal network of $sp^2$ hybridized carbon atoms. Graphene nanoribbons are narrow, elongated strips (or "ribbons") of monolayer graphene having widths and crystallographic edge structures that provide the ribbons with electronic properties, such as electronic bandgaps, that are absent in continuous two-dimensional films of graphene. Nanoribbons can have aspect ratios of at least 5, at least 10, at least 100, or at least 1000. Graphene nanostructures may comprise monolayer graphene or multilayered graphene.

The one or more nanostructures may have a variety of shapes, including hollow cylinders (e.g., nanotubes, including carbon nanotubes), solid cylinders (e.g., nanowires, including metal nanowires), and high aspect ratio thin strips (e.g., nanoribbons, including graphene nanoribbons and hexagonal boron nitride (h-BN) nanoribbons). A nanofilm is a type of nanostructure having the form of a layer of material having a thickness falling within the above-recited size ranges, but lateral dimensions (widths and lengths) that exceed 1 μm. Nanofilms include monolayer films of graphene and monolayer films of h-BN.

First substrate 100 may be a substrate upon which the nanostructures are grown using, for example, chemical vapor deposition (CVD) growth. By way of illustration, graphene can be grown on germanium (Ge) substrates via CVD. Other metal substrates upon which graphene can be grown include copper (Cu), ruthenium (Ru), nickel (Ni), palladium (Pd), iridium (Ir), and silicon carbide (SiC). The nanostructures may be grown in the form of nanostructures on the growth substrate (i.e., bottom-up growth) or may be lithographically patterned from a larger film of material that is grown on the growth substrate (i.e., top-down fabrication). A detailed description of methods for bottom-up growth of graphene nanoribbons on germanium can be found in Way, Austin J., et al., *The journal of physical chemistry letters* 10.15 (2019): 4266-4272 and Way, Austin J., Robert M. Jacobberger, and Michael S. Arnold, *Nano letters* 18.2 (2018): 898-906. It should be noted, however, that first substrate 100 need not be a CVD growth substrate, or even a growth substrate. First substrate 100 may be any substrate on which the nanostructures are disposed that can be selectively removed from the nanostructures during the transfer process. Thus, first substrate 100 can be composed of a variety of materials, including inorganic materials, such as metals, semiconductors, and dielectric materials.

Crosslinkable copolymer 104 is polymerized from a first monomer that lacks crosslinkable functional groups and a comonomer that introduces a crosslinkable functional group into the copolymer. The crosslinkable copolymer may be a random copolymer. (For the purposes of this disclosure, a crosslinkable functional group is a functional group that is available to form crosslinks between copolymer backbone chains after the monomers have been polymerized. Thus, crosslinkable functional groups are distinct from polymerizable functional groups, such as the C═C double bonds of (meth)acrylates, that undergo polymerization reactions to form the backbone of the copolymers.)

The first monomers that are incorporated into the copolymers do not participate in copolymer crosslinking in transfer methods described herein. Although the copolymers are polymerized from at least one monomer that is a non-crosslinking monomer, two or more non-crosslinking monomers can be incorporated into the copolymers. Suitable non-crosslinking monomers include methyl methacrylate monomers and/or methyl acrylate monomers (collectively referred to as methyl (meth)acrylate monomers), lactic acid monomers, phthalaldehyde monomers, bisphenol A carbonate monomers, and combinations of two or more thereof.

Figure 2:
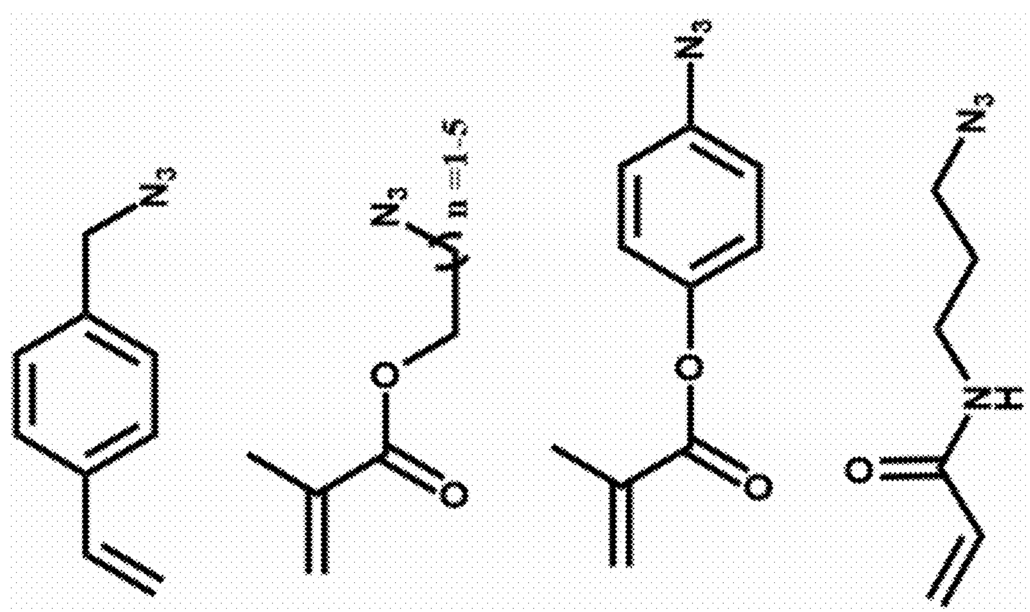
FIG. 2 shows the structures of various monomers bearing crosslinkable azide groups.

The comononers are monomers bearing crosslinkable functional groups. The crosslinkable functional groups form crosslinks between copolymer backbone chains and are also able to form bonds between copolymer 104 and first substrate 100. The bonds may be, for example, covalent bonds and/or ionic bonds. Although the copolymers are polymerized from at least one monomer bearing a crosslinkable group, two or more crosslinking monomers can be incorporated into the copolymers. Suitable crosslinkable groups include groups that undergo free-radical polymerization processes, such as epoxy groups, vinyl groups, and azide groups. Monomers bearing these groups include azido-substituted methacrylates, acrylates and styrenic monomers. These monomers, which are described in Mansfeld, Ulrich, et al. *Polymer Chemistry* 1.10 (2010): 1560-1598, include those having the structures shown in FIG. 2. These structures can be expanded to o, p, and m substitution on the benzene ring and to include linkers from 1-12 methylene units in the acrylates and methacrylates.

Some embodiments of the crosslinkable copolymers are polymerized from only one or more of the non-crosslinking monomers listed above and one more of the crosslinkable group-bearing monomers listed above. However, other non-crosslinking monomers and crosslinkable group-bearing monomers can be used. Copolymers of methyl (meth)acrylate and glycidyl methacrylate and/or glycidyl acrylate (collectively referred to as glycidyl (meth)acrylate monomers) are one example of a crosslinkable copolymer that can be used. The copolymers may consist of only polymerized of methyl (meth)acrylate and glycidyl (meth)acrylate monomers.

Once the layer of crosslinkable copolymer 104 has been applied to the exposed surfaces of first substrate 100 and nanostructures 102, it is cured to induce crosslinking and substrate-copolymer bond formation. Thermal curing of the copolymer can be carried out by heating the copolymer to a temperature at which the crosslinkable groups undergo crosslinking reactions and copolymer-substrate bond formation. The optimal curing temperature will vary depending upon the particular comonomers and first substrates being used. Temperatures in the range from about 100° C. to about 250° C. are typically sufficient.

Relative to a PMMA homopolymer, the crosslinkable copolymers bond more strongly to the first substrate and, as a result, are able to transfer even very narrow nanostructures between substrates with high yields. The crosslinkable comonomers are a minor component in the copolymer; they are present at a concentration sufficient to provide enhanced substrate bonding and polymer rigidity, relative to a PMMA homopolymer. However, because increased crosslinking makes the copolymer more difficult to remove, the concentration of polymerized crosslinkable monomers in the copolymers is desirably limited. By way of illustration, in various embodiments of the copolymers, the comonomers bearing the crosslinkable groups make up no more than 20 mol. % of the copolymer. This includes embodiments in which the comonomers bearing the crosslinkable groups make up no more than 10 mol. % of the copolymer, no more than 6 mol. % of the copolymer, and no more than 4 mol. % of the copolymer. By way of illustration, the polymerized crosslinkable group-bearing comonomer may make up 1 mol. % to 20 mol. % of the copolymer, including embodiments in which the polymerized crosslinkable group-bearing comonomer make up from 2 mol. % to 8 mol. % of the copolymers. The balance of the copolymers is formed from polymerized non-crosslinking monomers.

The copolymer layer should be sufficiently thick to facilitate handling during the nanostructure transfer process, but is not otherwise particularly limited. However, unnecessarily thick layers will extend the time needed to remove the copolymer. Generally, a thickness in the range from about 100 nm to 1 μm is sufficient. If cost or other concerns make it undesirable to use a thick layer of the copolymer, a thin layer of the copolymer can be applied to the nanostructures and a thicker layer of a second homopolymer or copolymer, such as a PMMA homopolymer, can be applied over the copolymer to provide a multilayered polymeric transfer medium.

Once copolymer 104 is formed and cured on the one or more nanostructures 102, first substrate 100 can be selectively removed using, for example, a wet or dry etch. Suitable etchants will remove first substrate 100 without etching the one or more nanostructures 102 or the copolymer 104, and, therefore, etchant selection will depend on the particular substrates, nanostructures, and copolymers being used. By way of illustration, a $H_2O$:HF:$H_2O_2$ etch can be used to selectively remove a Ge substrate, and an aqueous solution of iron nitrate or iron chloride can be used to remove a Cu substrate.

The one or more released nanostructures 102 and copolymer 104 are then transferred to second substrate 108. Second substrate 108 may be composed of various materials, including metals, semiconductors, and dielectric materials. Inorganic and organic (e.g., polymer) substrates can be used. As shown in the embodiment of FIG. 1, panel (e), second substrate 108 may be a multilayered substrate. For example, a substrate comprising a relatively thin layer 108, such as a dielectric layer, over a thicker support 110 can be used. Illustrative examples of substrates onto which the nanostructures can be transferred include $SiO_2$/Si substrates, polyethylene terephthalate (PET) substrates, sapphire substrates, and mica substrates.

The transfer to second substrate 108 can be a wet transfer or a dry transfer. In one embodiment of a wet transfer process, the copolymer 104/nanostructure 102/first substrate 100 stack is submerged in wet etchant 106 to selectively remove first substrate 100. The resulting released copolymer 104/nanostructure 102 stack can then be transferred to and floated on the surface of a water bath. Second substrate 108/110 is then used to lift the copolymer 104/nanostructure 102 stack out of the water bath. The copolymer 104/nanostructure 102/second substrate 108/110 stack can then be dried. Optionally, the copolymer 104/nanostructure 102/second substrate 108/110 stack can be heated to a temperature that promotes adhesion between one or more nanostructures 102 and the surface of the second substrate 108. Typically, temperatures in the range from about 100° C. to about 150° C. are sufficient.

Copolymer 104 is then selectively removed from the one or more nanostructures 102. The removal of copolymer can be achieved with organic solvents, a thermal anneal, or a combination thereof. In some embodiments of the copolymer removal step, the copolymer is first solvated using a suitable solvent and any residual polymer is then removed during the thermal anneal. Suitable solvents include acetone and N-methyl-2-pyrrolidone (NMP). However, depending upon the particular copolymer being used, other organic solvents can be used. Annealing temperatures in the range from 300° C. to 500° C. are typically suitable. However, temperatures outside of this range can be used.

Example

This example illustrates a method of transferring an array of graphene nanoribbons from a Ge CVD growth substrate to a $SiO_2$/Si device substrate using a PMMA-GMA copolymer as a transfer medium. The transfer process is compared to an analogous transfer process in which a PMMA homopolymer is used as a transfer medium.

A degenerately doped Si wafer with 15 nm of thermally grown $SiO_2$ was chosen as the transfer substrate because it can serve as a universal back-gate for the fabrication of a field-effect transistor (FET), as depicted in panel (f) of FIG. 1.

Experimental Methods

Graphene nanoribbons were grown via anisotropic CVD growth on a Ge(001) wafer. Methods for growing graphene nanoribbons via anisotropic CVD growth on Ge(001) are known and more details regarding these methods can be found in Way, Austin J., et al., *The journal of physical chemistry letters* 10.15 (2019): 4266-4272 and Way, Austin J., Robert M, Jacobberger, and Michael S. Arnold, *Nano letters* 18.2 (2018): 898-906.

Microscopy. After transfer, the samples were characterized via SEM (Zeiss LEO 1530).

Figure 3A:
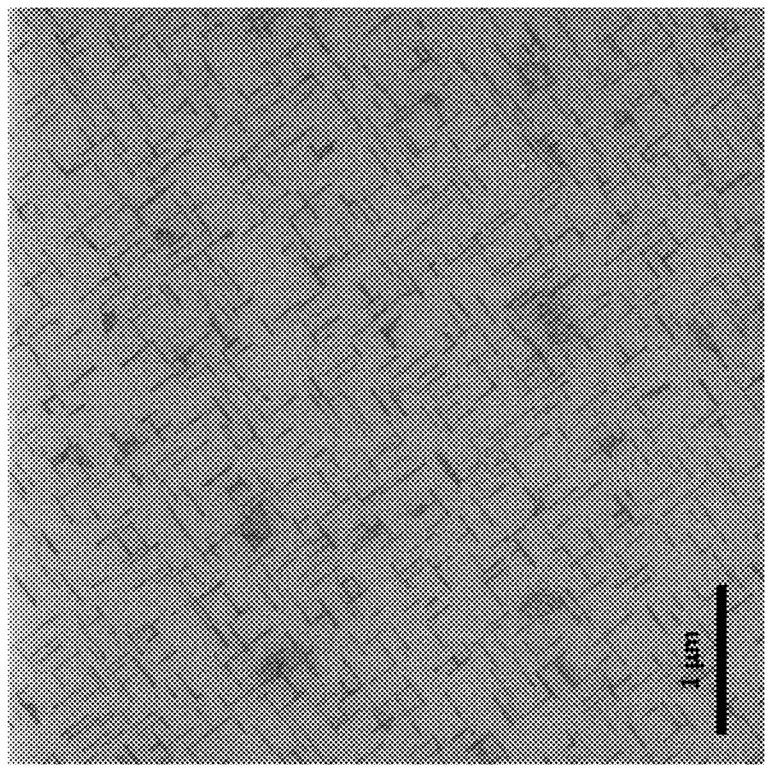
FIG. 3A shows a scanning electron microscopy (SEM) image of graphene nanoribbons transferred from a Ge(001) substrate to a $SiO_2$ substrate using a poly((methyl methacrylate)-(glycidyl methacrylate)) copolymer as a transfer medium. Scale bar is 1 μm.

Graphene Nanoribbon Transfer. The graphene nanoribbons were transferred to $SiO_2$ on Si using a PMMA-GMA copolymer. The copolymer was polymerized from 96 mol % methyl methacrylate (MMA) with 4 mol % of thermally crosslinkable glycidyl methacrylate (GMA), as described in Liu, C. et al., *Macromolecules,* 2011, 44 (7), 1876-1885. The PMMA-GMA (96% PMMA, 4% GMA) was spin-coated on the graphene nanoribbons and the exposed areas of the Ge(001) surface and then thermally annealed at 160° C. for 3 h in a vacuum to promote crosslinking and better bonding of the copolymer with the Ge substrate. Excess copolymer was removed by rinsing in toluene, resulting in a film that was 3 to 5 nm in thickness. For better handling, PMMA homopolymer was spin-coated on top of the PMMA-GMA film, and the substrate was annealed at 160° C. for 5 hours in an $N_2$ environment (<1 ppm $O_2$ and <1 ppm $H_2O$). The thickness of the PMMA layer was 1 μm. The backside of the sample that was uncoated with polymer underwent an $O_2$ plasma etch (50 W, 10 mTorr, 10 sccm of $O_2$) for 3 min (Unaxis 790 Reactive Ion Etcher) to remove graphene. The sample was then floated on 3:1:1 $H_2O$:HF:$H_2O_2$ to etch away the Ge substrate. The released nanoribbon/copolymer membrane was transferred from the Ge etchant to three successive $H_2O$ baths and finally to a piranha cleaned $SiO_2$ (15 nm) on Si substrate. The transferred nanoribbon/copolymer membrane and the $SiO_2$/Si substrate were then spin dried and then annealed at 120° C. for 3 min in an $N_2$ environment (<1 ppm $O_2$ and <1 ppm $H_2O$). To remove the PMMA and the underlying PMMA-GMA, the Si/$SiO_2$/graphene nanoribbon/PMMA-GMA/PMMA stack was soaked in acetone at room temperature for ~1 h, followed by an anneal in a horizontal quartz tube furnace at 400° C. for 1 h at ~$10^{-6}$ torr to remove polymer residue. FIG. 3A is an SEM image of the graphene nanoribbon array after the transfer to the $SiO_2$ showing that the graphene nanoribbons were uniformly transferred with a nearly 100% transfer yield over the 5×5 $mm^2$ surface area of the $SiO_2$ substrate.

Figure 3B:
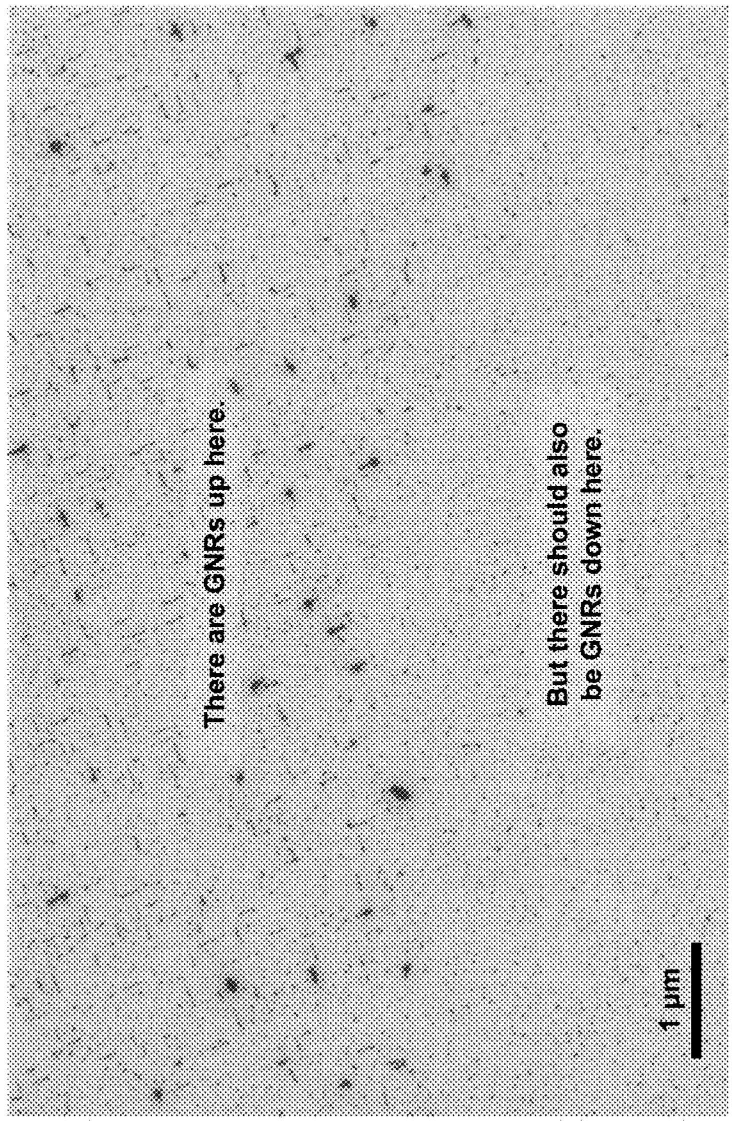
FIG. 3B shows an SEM image of graphene nanoribbons transferred from a Ge(001) substrate to a $SiO_2$ substrate using a poly(methyl methacrylate) homopolymer as a transfer medium. Scale bar is 1 μm.

For comparison, graphene nanoribbons grown on a Ge(001) wafer using the same anisotropic CVD growth process were transferred from the Ge(001) substrate to a degenerately doped Si wafers with 15 nm of thermally grown $SiO_2$ substrate using the method described above, except that a PMMA homopolymer layer having a thickness of 1000 nm was used for the transfer. FIG. 3B is an SEM image of the graphene nanoribbon array after the transfer to the $SiO_2$ showing a poor graphene nanoribbon transfer yield of approximately 25%, with a large section (lower area) of the surface of the $SiO_2$ substrate having no transferred graphene nanoribbons.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure the words "a" or "an" can be used to mean "one" or "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for transferring one or more nanostructures from a first substrate to a second substrate, the method comprising:

applying a coating of a crosslinkable copolymer over one or more nanostructures on a surface of the first substrate, wherein the crosslinkable copolymer is polymerized from one or more non-crosslinking monomers and one or more comonomers bearing crosslinkable groups;

heating the crosslinkable copolymer to induce crosslinking of the crosslinkable copolymer and to form bonds between the crosslinkable copolymer and the surface of the first substrate;

releasing the one or more nanostructures and the crosslinked copolymer from the first substrate;

transferring the one or more nanostructures and the crosslinked copolymer onto a surface of the second substrate; and removing the crosslinked copolymer from the one or more nanostructures.

2. The method of claim 1, wherein the crosslinkable groups comprise epoxy groups, azide groups, vinyl groups, or a combination thereof.

3. The method of claim 1, wherein the one or more non-crosslinking monomers comprise methyl(meth)acrylate monomers.

4. The method of claim 1, wherein the one or more comonomers comprise glycidyl (meth)acrylate monomers.

5. The method of claim 3, wherein the one or more comonomers comprise glycidyl (meth)acrylate monomers.

6. The method of claim 1, wherein the one or more comonomers comprise lactic acid monomers, phthalaldehyde monomers, bisphenol A carbonate monomers, or a combination thereof.

7. The method of claim 3, wherein the one or more comonomers comprise lactic acid monomers, phthalaldehyde monomers, bisphenol A carbonate monomers, or a combination thereof.

8. The method of claim 1, wherein the crosslinkable copolymer comprises from 1 mol. % to 20 mol. % of the polymerized comonomers and from 99 mol. % to 80 mol. % of the polymerized non-crosslinking monomers.

9. The method of claim 1, wherein the crosslinkable copolymer comprises from 2 mol. % to 8 mol. % of the polymerized comonomers and from 98 mol. % to 92 mol. % of the polymerized non-crosslinking monomers.

10. The method of claim 1, wherein the crosslinkable copolymer consists of only polymerized methyl (meth)acrylate monomers and polymerized glycidyl (meth)acrylate monomers.

11. The method of claim 8, wherein the crosslinkable copolymer consists of only polymerized methyl (meth)acrylate monomers and polymerized glycidyl (meth)acrylate monomers.

12. The method of claim 11, wherein the one or more nanostructures comprise graphene nanoribbons.

13. The method of claim 12, wherein the first substrate is a germanium substrate.

14. The method of claim 1, wherein the one or more nanostructures comprise graphene nanoribbons.

15. The method of claim 14, wherein the first substrate is a germanium substrate.

16. The method of claim 2, wherein the crosslinkable groups comprise the epoxy groups.

17. The method of claim 2, wherein the crosslinkable groups comprise the azide groups.

18. The method of claim 2, wherein the crosslinkable groups comprise the vinyl groups.

19. The method of claim 1, further comprising heating the transferred one or more nanostructures and the second substrate to form bonds between the one or more nanostructures and the second substrate, prior to removing the crosslinked copolymer from the one or more nanostructures.

* * * * *